US008687633B2

(12) United States Patent
Rabie et al.

(10) Patent No.: US 8,687,633 B2
(45) Date of Patent: *Apr. 1, 2014

(54) ETHERNET DIFFERENTIATED SERVICES ARCHITECTURE

(75) Inventors: Sameh Rabie, Kanata (CA); Osama Aboul-Magd, Kanata (CA); Bashar Abdullah, Kanata (CA); Baghdad Barka, Nepean (CA)

(73) Assignee: Rockstar Consortium US LP, Plano, TX (US)

( * ) Notice: Subject to any disclaimer, the term of this patent is extended or adjusted under 35 U.S.C. 154(b) by 438 days.

This patent is subject to a terminal disclaimer.

(21) Appl. No.: 12/939,304

(22) Filed: Nov. 4, 2010

(65) Prior Publication Data

US 2011/0051723 A1    Mar. 3, 2011

Related U.S. Application Data

(63) Continuation of application No. 10/868,607, filed on Jun. 15, 2004, now Pat. No. 7,843,925.

(60) Provisional application No. 60/537,487, filed on Jan. 20, 2004.

(51) Int. Cl.
  *H04L 12/28* (2006.01)
  *H04L 12/56* (2011.01)
(52) U.S. Cl.
  USPC ........................................................ 370/389
(58) Field of Classification Search
  None
  See application file for complete search history.

(56) References Cited

U.S. PATENT DOCUMENTS

| 6,185,203 | B1 | 2/2001 | Berman |
| 6,577,642 | B1 | 6/2003 | Fijolek et al. |
| 6,611,522 | B1 | 8/2003 | Zheng et al. |
| 6,647,428 | B1 | 11/2003 | Bannai et al. |
| 6,711,614 | B1 * | 3/2004 | Suzuki .......................... 709/224 |
| 6,798,775 | B1 | 9/2004 | Bordonaro et al. |
| 6,839,327 | B1 * | 1/2005 | Zavalkovsky et al. ........ 370/252 |
| 6,912,225 | B1 | 6/2005 | Kohzuki et al. |
| 7,050,396 | B1 | 5/2006 | Cohen et al. |
| 7,180,860 | B2 | 2/2007 | Fonden et al. |
| 7,184,413 | B2 | 2/2007 | Beyer et al. |
| 7,277,442 | B1 | 10/2007 | Holmgren et al. |
| 7,295,562 | B1 * | 11/2007 | Acharya et al. ............... 370/412 |
| 7,366,168 | B2 | 4/2008 | Hughes et al. |
| 7,702,357 | B2 | 4/2010 | Yam |
| 8,472,322 | B2 * | 6/2013 | Black et al. ................... 370/235 |
| 2002/0031142 | A1 | 3/2002 | Metin et al. |
| 2002/0176450 | A1 | 11/2002 | Kong et al. |

(Continued)

OTHER PUBLICATIONS

Alj et al.: "Admission Control and Bandwidth Management for VLANs" High Performance Switching and Routing, 2001 IEEE Workshop on May 19-31, 2001, Piscataway, NJ, USA, IEEE, May 29, 2001, pp. 130-134.

(Continued)

*Primary Examiner* — Hassan Phillips
*Assistant Examiner* — Prenell Jones
(74) *Attorney, Agent, or Firm* — Christopher & Weisberg, P.A.

(57) ABSTRACT

An edge node of a communication network and method to classify incoming Ethernet traffic based on predetermined criteria. An ingress switch is configured to receive an incoming Ethernet frame. A frame classifier is configured to identify flows and to correlate a flow to a corresponding bandwidth profile and corresponding forwarding treatments defined for the flow.

20 Claims, 9 Drawing Sheets

(56) References Cited

U.S. PATENT DOCUMENTS

| | | |
|---|---|---|
| 2003/0031182 A1 | 2/2003 | O'Neil et al. |
| 2003/0048791 A1 | 3/2003 | De Cnodder et al. |
| 2003/0053464 A1 | 3/2003 | Chen et al. |
| 2003/0067934 A1 | 4/2003 | Hooper et al. |
| 2003/0076838 A1 | 4/2003 | Shaio et al. |
| 2003/0099237 A1 | 5/2003 | Mitra et al. |
| 2003/0103503 A1 | 6/2003 | Dubuc et al. |
| 2003/0118026 A1 | 6/2003 | Kuhl et al. |
| 2003/0126286 A1* | 7/2003 | Lee .................. 709/238 |
| 2004/0022255 A1 | 2/2004 | Chen et al. |
| 2004/0252717 A1 | 12/2004 | Solomon et al. |
| 2005/0141509 A1 | 6/2005 | Rabie et al. |
| 2005/0157645 A1 | 7/2005 | Rabie et al. |
| 2005/0157729 A1 | 7/2005 | Rabie et al. |
| 2005/0157737 A1 | 7/2005 | Rabie et al. |
| 2005/0163132 A1 | 7/2005 | Mieno et al. |
| 2006/0182098 A1* | 8/2006 | Eriksson et al. .......... 370/389 |
| 2008/0159152 A1* | 7/2008 | Ben-Shalom et al. ........ 370/242 |
| 2011/0142061 A1* | 6/2011 | Wang et al. .................. 370/401 |

OTHER PUBLICATIONS

European Examination Report dated Sep. 26, 2013 for corresponding European Application Serial No. 05 706 399.2-1862, European Filing Date: Jan. 20, 2005 consisting of 6 pages.

* cited by examiner

| p-bits | Nodal Behavior |
|---|---|
| 111 _120_ | E-EF |
| 110 _122_ | E-AF22 |
| 101 _124_ | E-AF21 |
| 100 _126_ | E-AF12 |
| 011 _128_ | E-AF11 |
| 010 _130_ | E-DF |
| 001 _132_ | Reserved for congestion indication in the backward or forward directions |
| 000 _134_ | |

FIG. 7

ETHERNET DIFFERENTIATED SERVICES ARCHITECTURE

CROSS-REFERENCE TO RELATED APPLICATION

This application is a Continuation of patent application Ser. No. 10/868,607, filed Jun. 15, 2004, entitled ETHERNET DIFFERENTIATED SERVICES ARCHITECTURE, which claims the benefit of U.S. Provisional Patent Application No. 60/537,487, filed Jan. 20, 2004, the entirety of which are incorporated herein by reference.

STATEMENT REGARDING FEDERALLY SPONSORED RESEARCH OR DEVELOPMENT n/a

FIELD OF THE INVENTION

The present invention relates to a method and system for quality of service support in Ethernet networks, and more particularly, the invention relates to utilization of p-bits for per-hop behavior of Ethernet frames.

BACKGROUND OF THE INVENTION

Ethernet is a widely installed local area network (LAN) technology. Ethernet technology can be cost effective, easy to configure, and is widely understood by network managers. Ethernet technology is increasingly being deployed in service provider metro and wide-area networks. Success of Ethernet in provider networks depends on the ability to provide service level agreements (SLAs) that can guarantee bandwidth, delay, loss, and jitter requirements to end-users. Service providers can offer multiple services with different quality-of-service (QoS) characteristics and performance guarantees.

The base Ethernet technology is specified in the IEEE 802.3 standard. Traditionally, Ethernet did not include QoS capabilities. More recently, the IEEE has introduced the user priority capability that enables the definition of up to eight classes of service (CoS). The user priority capability is often referred to as "the p-bits." The p-bits are carried in the 802.1Q tag and are intended for use to identify different service classes.

An Ethernet network may include multiple customer edge (CE) devices, switches, and routers. These devices may communicate using the Ethernet protocols and/or other networking technologies and protocols.

SUMMARY OF THE INVENTION

The present invention advantageously provides a method and system for conditioning Ethernet traffic at a core node of a communication network. In accordance with one aspect, a method includes identifying a flow of Ethernet traffic and classifying frames of the flow based on p-bits of the frames. The p-bits are used to indicate a per-hop behavior of a frame.

In accordance with another aspect, the present invention includes an edge node of a communication network to classify incoming Ethernet traffic based on predetermined criteria in which the edge node has an ingress switch configured to receive an incoming Ethernet frame. A frame classifier is configured to identify flows and to correlate a flow to a corresponding bandwidth profile and corresponding forwarding treatments defined for the flow.

Embodiments may also include one or more of the following. The set of bits can include a set of p-bits in the Ethernet header. Setting the set of bits can include mapping the Ethernet per-hop behaviors to a set of bits in a frame according to a core network technology. Setting the set of bits can include mapping the Ethernet per-hop behaviors to a set of connections according to a core network technology.

The method can also include metering the frame. Metering the frame can include modifying the drop precedence and per-hop behavior of the frame. The method can also include determining a forwarding treatment for the frame based on the per-hop behavior or dropping the frame based on the per-hop behavior. The method can also include marking the frame based on the assigned PHB. The method can also include shaping the frame based on the assigned PHB.

The method can include scheduling the frame for delivery on the Ethernet network. Scheduling can include allocating a link bandwidth based on the PHBs. Scheduling can include allocating a link bandwidth among multiple virtual local area networks (VLANs), the VLANs including multiple E-Diff traffic classes and allocating portions of the allocated bandwidths for the multiple virtual local area networks among at least one VLAN class for the multiple local area networks based on the priority bits. Scheduling can include allocating a bandwidth among a set of service classes, allocating portions of the allocated bandwidths for the set of service classes among at least one particular service class, the service class including multiple VLAN classes, and allocating portions of the allocated bandwidths for the particular service classes among a particular VLAN class based on the priority bits.

The forwarding treatment can be based on an Ethernet differentiated services class. The Ethernet differentiated services class can include one or more of Ethernet expedited forwarding (E-EF), Ethernet assured forwarding (E-AF), Ethernet class selector (E-CS), and Ethernet default forwarding (E-DF). Determining a forwarding treatment can include defining additional per-hop behaviors based on networking or application needs.

The frame can include a canonical format indicator (CFI) bit, which can be used for CoS indication. Classifying the frame based on a set of predetermined criteria associated with combinations of the priority bits can include classifying the frame based a set of predetermined criteria associated with combinations of the priority bits and the CFI bit. The priority bits can include a congestion indication. The congestion indication pan include at least one of a forward and a backward congestion indication.

The above aspects or other aspects of the invention may provide one or more of the following advantages. Aspects may provide a scalable Ethernet differentiated services architecture that is capable of supporting different services and performance characteristics. The architecture can accommodate a wide variety of services and provisioning policies. The Ethernet differentiated services architecture can allow for incremental deployment, and permitting interoperability with non-Ethernet differentiated services compliant network nodes.

A variation of the architecture where Ethernet is used at the access and a different technology at the network core provides an advantage of allowing differentiated services across heterogeneous networks.

Ethernet differentiated services domains are multiple enterprise and/or provider networks/segments that employ different Ethernet differentiated services methods and policies within each domain, such as different p-bits interpretations, number/type of PHBs, etc. Mapping or traffic conditioning can be used at the boundary nodes between different domains.

Ethernet class of service (CoS) bits identifies nodal behavior. (e.g., how an incoming frame should be handled at queuing and scheduling levels based on p-bits encoding) and allows frames to be forwarded according to the specified nodal behaviors. Ethernet per-hop-behaviors are determined or encoded by a specific assignment of the p-bits. The p-bits can also include congestion information to indicate network congestion.

The particular use of the 802.1Q VLAN Tag Control Information (e.g., p-bits) enables the introduction of the differentiated services to Ethernet technologies. The use of the p-bits allows the definition of a number of defined per-hop behaviors (PHBs) that determine the forwarding treatment of the Ethernet frames throughout the network.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 7 is table of priority bit assignments.

DETAILED DESCRIPTION OF THE INVENTION

Figure 1:
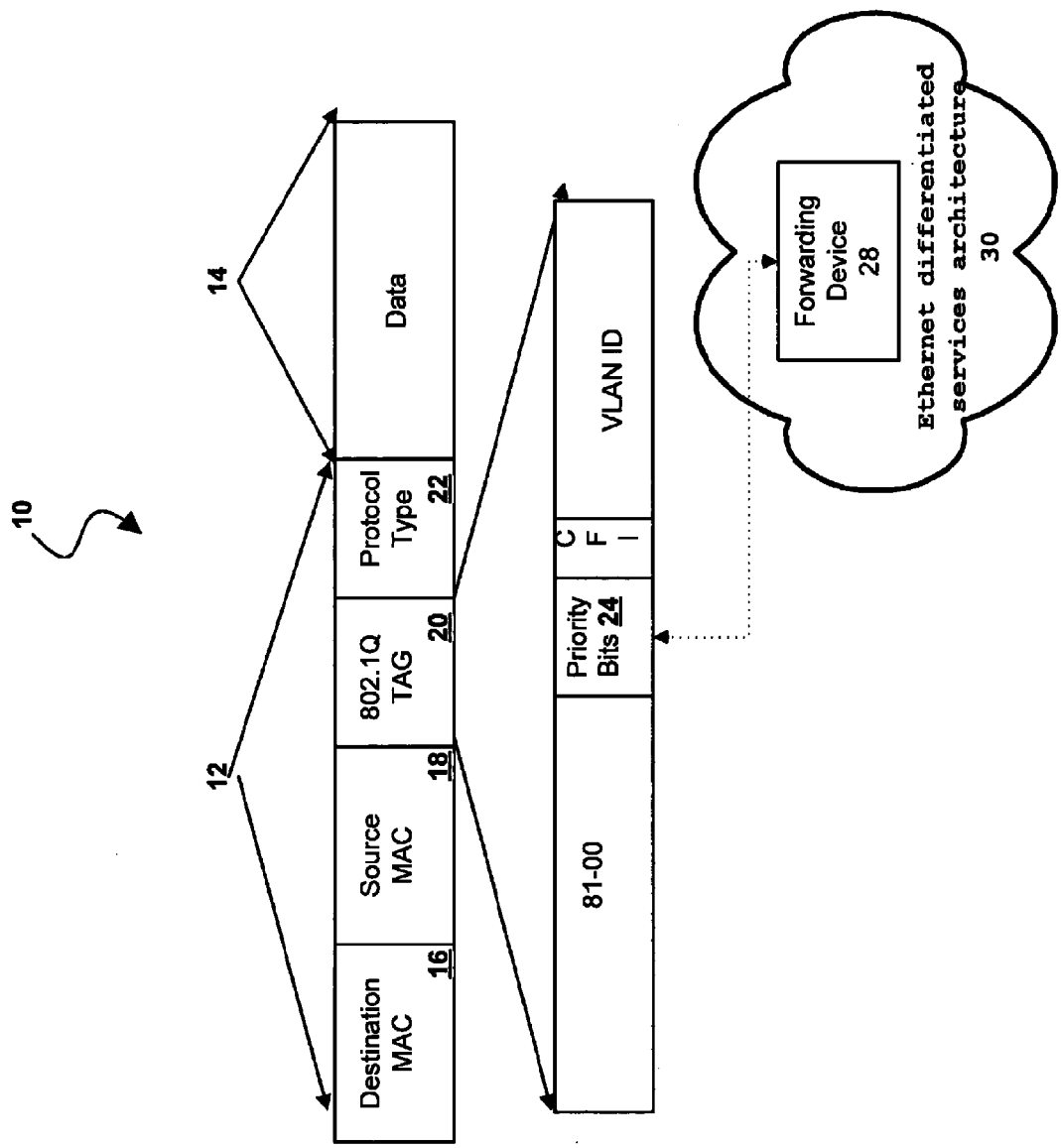
FIG. 1 is a block diagram of a tagged Ethernet frame.

Referring to FIG. 1, an example of an Ethernet frame 10 is shown. The frame includes a header portion 12 and a data portion 14. The header 12 includes a: destination address 16, a source address 18, an 802.1Q. tag 20, and a protocol type 22. The Institute for Electrical Engineers (IEEE) standard 802.1Q describes the 802.1Q tag 20. The 802.1Q tag in an Ethernet frame that defines a virtual-LAN (VLAN) membership. Three bits of this tag, referred to as the priority bits 24, identify user priority. The three priority bits 50 provide eight combinations and describe up to eight levels of service. The three priority bits can be used to describe the per-hop behavior of a frame. Per-hop-behaviors include for example, externally observable forwarding behavior applied to a frame by a frame forwarding device 20 in an Ethernet differentiated services architecture 30.

Figure 2:
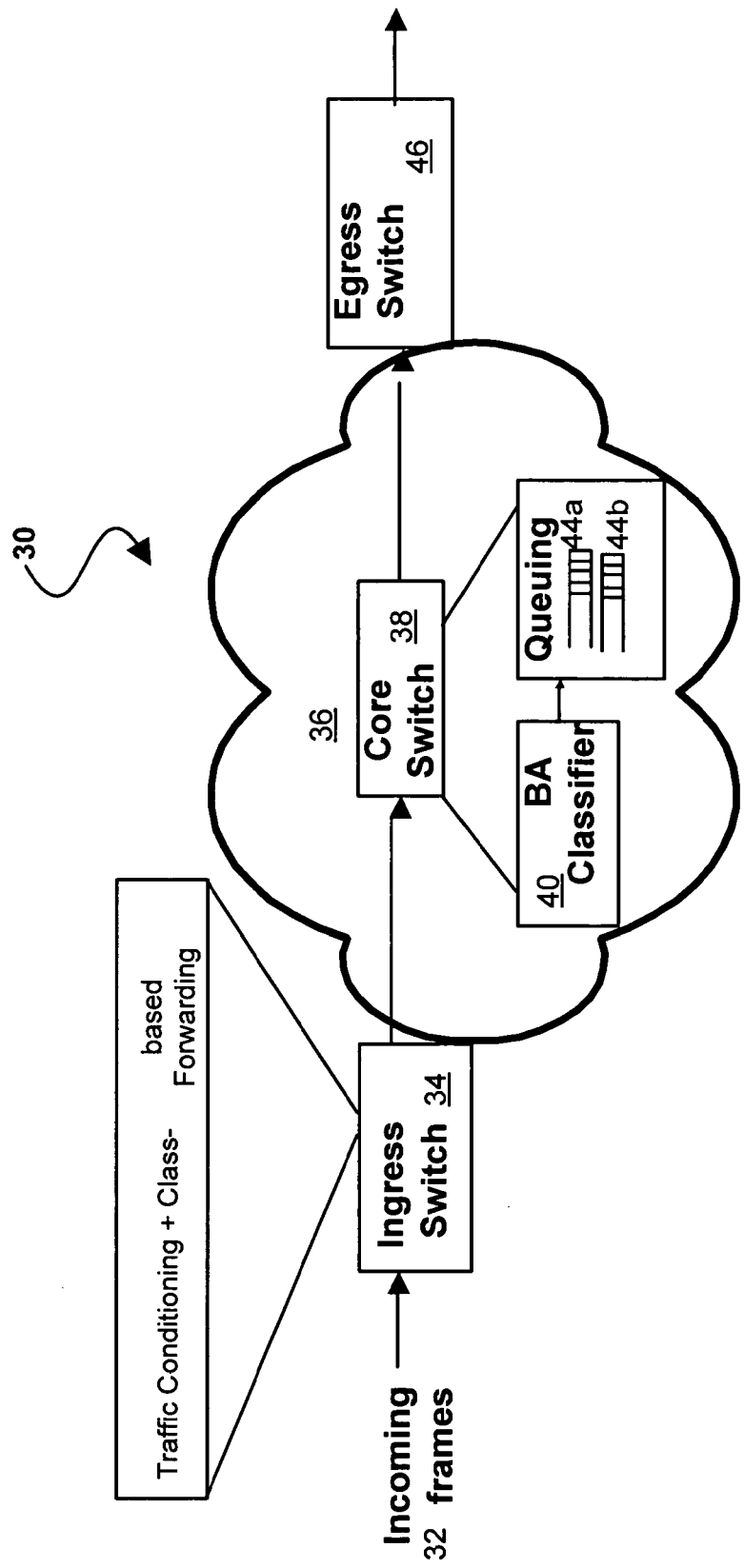
FIG. 2 is a block diagram of a Ethernet differentiated services architecture.

Referring to FIG. 2, the Ethernet differentiated services architecture 30 is shown. This architecture 30 forwards frames based on the per-hop-behaviors defined by the p-bits 24 for the frames. One embodiment of the architecture 30 includes a frame forwarding device 20 that includes an ingress switch 34, a core switch 38, and egress switch 46. The ingress switch 34 performs traffic conditioning functions and class-based forwarding functions. The core switch 38 includes a behavior aggregate (BA) classifier 40 and a class-based egress scheduler that uses multiple queues 44. The egress switch 46 may perform similar functions to either the ingress switch 34 or core switch 38 (or a subset of those functions), depending on network configurations and policies. For example, if the egress switch 46 is connected to a customer edge node, the egress switch 46 can perform core node-like forwarding functions. Alternately, if the egress switch 46 is connected to another provider network using an network-network interface (NNI), the egress switch 46 Deforms traffic conditioning functions according to the service contract between the two providers. The architecture 30 includes Ethernet differentiated services functions implemented at both the edge and the network core 36, although other arrangements may be possible.

Unlike the IP DiffServ ("Differentiated services") Architecture, described in RFC 2475, the architecture 30 shown in FIG. 2 does not use the IP DSCP for indicating frame per-hop behaviors. Instead, the architecture 30 uses the Ethernet p-bits 24. Architecture 30 assumes that edge and core nodes are p-bit aware nodes, meaning that e.g., that the nodes can set, clear and/or process frames based on the states of the p-bits. For example, all edge and core nodes are VLAN-aware Ethernet nodes that can set and/or interpret the p-bits. The network core 36 may be an Ethernet network such as is common in enterprise networks or a provider metro Ethernet network, and may use some Ethernet tunneling/aggregation techniques such as stacked virtual large area networks (VLAN) support such as Q-in-Q (referring to the 802.1Q tag), Media access control in media access control (MAC-in-MAC, or an equivalent scheme).

The architecture 30 separates edge and network core node functions. That is, the edge includes traffic conditioning that may include multi-field classification, metering, and marking of the per-hop behavior (PHB) in the p-bits 24, together with class-based forwarding. On the other hand, the edge functions may occur at the user-network interface (UNI) for example, between the customer edge (CE) node and service provider, or at the network-network interface (NNI) between networks/domains. The core node 36 is scalable and performs simple behavior and aggregate classification based on the frame per-hop-behavior (PHB) (indicated in the p-bits 24), and class-based forwarding based on the PHB value.

Figure 3:
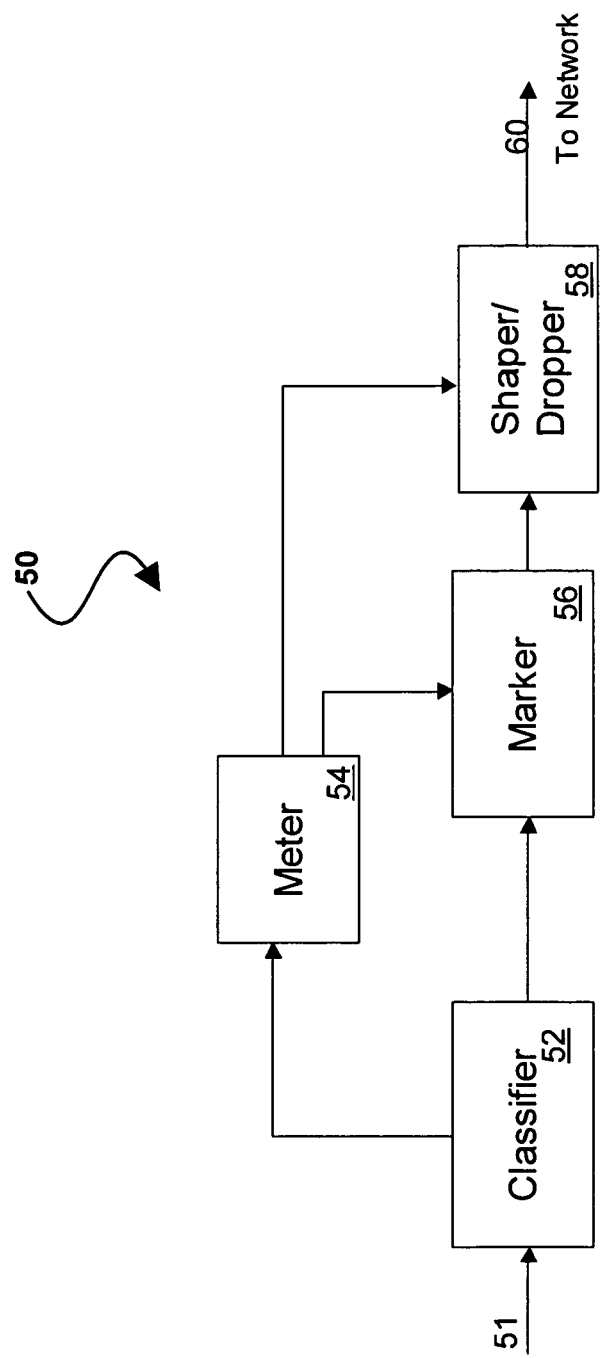
FIG. 3 is a block diagram of a set of components included in a device at an edge node of a network.

Referring to FIG. 3, components 50 included in a device at the network edge nodes are shown. For example, the set of components 50 are included in an ingress switch such as switch 34 (FIG. 2). The set of components 50 includes a classifier 52, meter 54, marker 56, and shaper/dropper 58. These components 50 perform Ethernet traffic conditioning functions at the network edge nodes to classify incoming traffic based on predetermined criteria.

The classification identifies flows and correlates the flows to corresponding bandwidth profiles for the flows and corresponding forwarding treatments defined or provided for the flows. The classifier 52 selects frames in a traffic stream based on content of some portion of the frame header (e.g., based on the p-bits). Two types of classifiers include behavior aggregate (BA) classifiers and multi-field (ME) classifiers. A BA classifier classifies frames based on the p-bits only. The MF classifier on the other hand selects frames based on the value of a combination of one or more header fields, such as source and destination address, p-bits, protocol ID, source and destination port numbers, and other information such as incoming interface/connection. In general, classifier 52 (e.g., a behavior aggregate (BA) classifier or multi-field (MF) classifier) is used to "steer" frames matching a rule to a different element of the traffic conditioner for further processing.

Frames enter classifier 52 (indicated by arrow 51) and may or may not be metered based on the service level agreement. Metered frames are passed to meter 54. Meter 54 measures the temporal properties of the stream of frames selected by a classifier and compares the properties to a traffic profile. A meter 54 passes state information to other components to trigger a particular action for each frame that is either in- or out-of-profile. Non-metered frames are passed from classifier 52 to marker 56.

Flows are marked (or remarked) by marker 56 to identify the Ethernet PHB applied to the incoming frame. For instance, frame marker 56 sets a particular field of a frame to a particular p-bit combination, adding the marked frame to a particular behavior aggregate. The marker 56 can be configured to mark all received frames to a single p-bit combination, or can be configured to mark a frame to one of a set of p-bit combinations used to select a particular PHB from a PHB group according to the state of the meter 54.

A PHB group is a set of one or more PHBs that can be specified and implemented simultaneously, due to a common constraint applying to all PHBs in the set such as a queue servicing or queue management policy. A PHB group allows a set of related forwarding behaviors to be specified together (e.g., four dropping priorities). A single PHB is a special case of a PHB group. When the marker 54 changes the p-bit combination in a frame it is referred to as having "re-marked" the frame.

Remarking may also occur across Ethernet-differentiated services domain boundaries, such as a user to network interface (UNI) or network to network interface (NNI) interface. Remarking could be used for such purposes as performing PHBs mapping or compression, or to effect p-bits translation.

If tunneling is used, the outer tunnel p-bits are usually also set to the desired PHB indication for forwarding through the aggregated core. The p-bits in the original Ethernet frame may be preserved through the network, or changed by the edge nodes.

Frames that exceed their assigned rates may be dropped, shaped, or remarked with a drop precedence indication. The shaper/dropper 58 shapes the traffic before sending the frames to the network as indicated by arrow 60. Shaper/dropper 58 discards some or all of the frames in a traffic stream in order to bring the stream into compliance with a traffic profile. This discarding is sometimes referred to as "policing" the stream. A dropper can be implemented as a special case of a shaper by setting the shaper buffer size to zero (or a few) frames.

In general, multi-field traffic classification is based on any of the L1-L7 protocol layer fields, either individually or in combination. Common L2 Ethernet fields used are the incoming Ethernet Interface (port), the Destination/Source MAC addresses, the virtual local area network identification (VLAN ID or VID), and the User Priority (p-bits). Based on the Destination/source media access, control (MAC) addresses all of the frames originating at a certain source and/or destined to a certain destination are assigned to the same flow. Thus, based on the VLAN ID all frames of a certain VLAN belong to the same flow.

Alternatively a Group of VLANs may be combined together for the purpose of class of service (CoS) functions. The user priority bits (p-bits 24) provide a finer granularity for flow identification.

The L2 Ethernet fields can be combined for traffic classification. Common combinations include: "port+p-bits", "VID(s)+p-bits." Common upper layer fields include IP differentiated services, IP source, IP Destination, IP Protocol Type, TCP port number, UDP port number.

Frame classification determines the forwarding treatment and metering of frames. Determining the forwarding treatment (e.g., congestion control, queuing and scheduling) by the edge nodes includes assigning PHBs to the group of frames that require the same treatment (e.g., Voice is assigned E-EF PHB, and Data is assigned E-AFx PHB). Metering can be used for determining and enforcing the bandwidth profile/traffic contract, and verifying the Service Level Agreements (SLAs), and allocating nodal resource to the flow.

The classification function may be different for the purpose of forwarding and metering. For example, voice and data typically receive different forwarding treatment, but their traffic bandwidth profile could be combined into a single traffic contract to resemble a leased line service.

Figure 4:
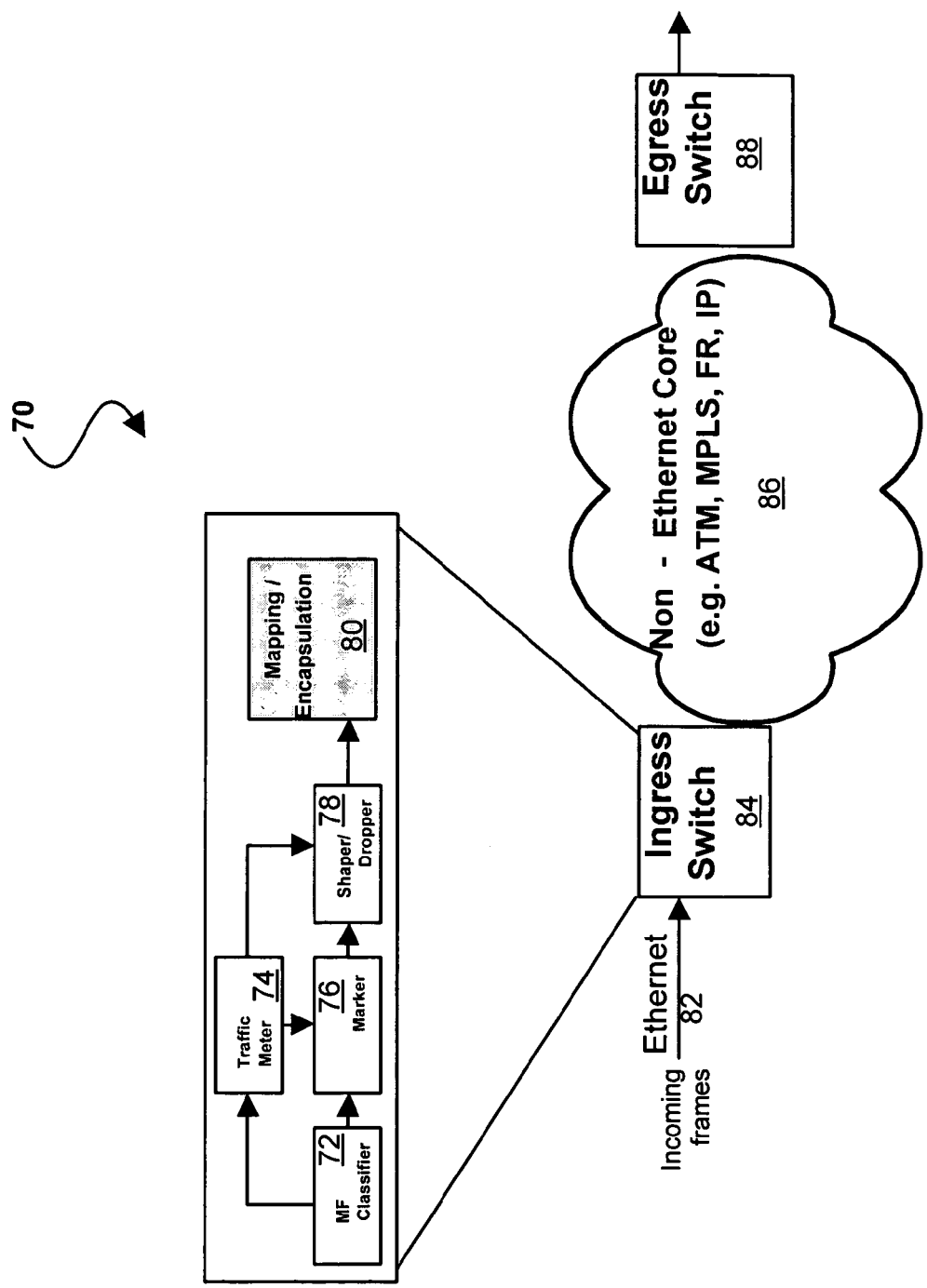
FIG. 4 is a block diagram of a Ethernet differentiated services architecture.

Referring to FIG. 4, another example of an Ethernet differentiated services architecture 70 is shown. The architecture 70 includes an ingress switch 84 at an interface between an Ethernet network 82 and a non-Ethernet network core 86. The architecture 70 also includes an egress switch 88. In this example, different technologies are used for forwarding the Ethernet frames through the non-Ethernet network core 86. For example, the non-Ethernet network core 86 could use asynchronous transfer mode (ATM), multi-protocol label switching (MPLS), frame relay (FR), Internet protocol (IP), or other network protocols.

The ingress switch 84 includes a classifier 72, traffic meter 74, marker 76, shaper/dropper 78, and a mapping unit 80. The classifier 72, traffic meter 74, marker 76, and shaper/dropper 78 function in a similar manner to those described above in FIG. 3. The mapping unit 80 maps and encapsulates the Ethernet frames for forwarding on the core network 86.

The architecture 70 shown in FIG. 4 is similar to architecture 30 shown in FIG. 2, however, architecture 70 uses Ethernet at the access, and a different networking technology in the core 86. The edge conditioning functions are similar to the edge conditioning functions in architecture 30. The Edge node performs the class of service (CoS) mapping from the Ethernet PHB into the core network 86. Many mapping methods are possible such as mapping the PHB to an ATM virtual channel connection (VCC) (e.g., E-EF to constant bit rate (CBR) VCC), a link-state packet (LSP), an IP Differentiated services Core, etc. In all cases, the original information in the Ethernet frame is maintained through transport through the core using tunneling and/or encapsulation techniques.

In the above example, frames are placed into class queues based on the PHB. Alternately, frames could be placed on different logical or physical ports or connections with different levels of service based on the PHB.

In both architecture 30 (FIG. 2) and architecture 70 (FIG. 4) edge CoS functions define per-hop behaviors for a frame. However, in architecture 30, a frame is forwarded based on per-hop-behaviors indicated in the p-bits 24, whereas in architecture 70, a frame is forwarded based on the core network technology CoS transport mechanism.

Figure 5:
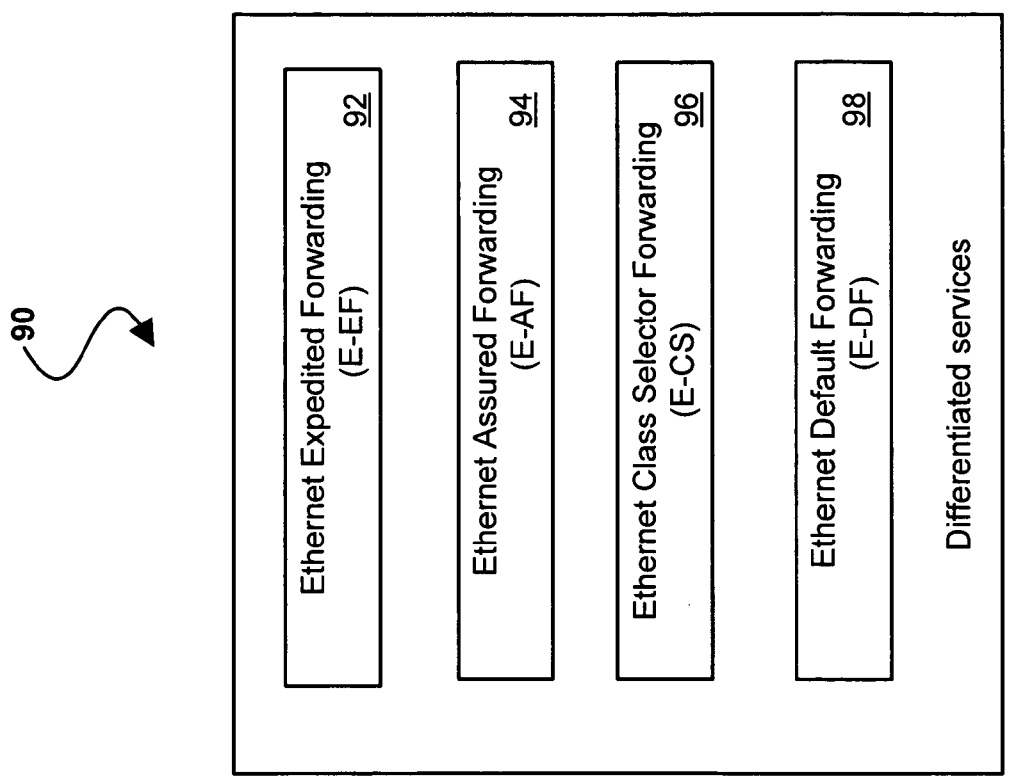
FIG. 5 is a block diagram of Ethernet differentiated services per-hop behaviors

Referring to FIG. 5, a grouping 90 of the nodal behaviors into, e.g., four categories is shown. The grouping 90 includes an Ethernet expedited forwarding category 92 (E-EF), Ethernet assured forwarding 94 (E-AP), Ethernet class selector 96 (E-CS), and Ethernet default-forwarding category 98 (E-DF). Other groupings of behaviors are possible.

The first category, referred to as an Ethernet expedited forwarding category 92 (E-EF) is primarily for traffic sensitive to delay and loss. This category is suitable for implementing services that require delivery of frames within tight delay and loss bounds and is characterized by a time constraint. A frame arriving to a network node and labeled as an Ethernet EF frame departs the node according to a time constraint (e.g., $d_k-a_k$ is less. than or equal to $t_{max}$ where $a_k$ and $d_k$ are the arrival and the departure times of the $k_{th}$ frame to the node and $t_{max}$ is the time constraint) E-EF allows for frame loss when buffer capacity is exceeded, however, the probability of frame loss in this service is typically low (e.g., $10^{-5}$-$10^{-7}$). E-EF identifies a single drop precedence and frames that exceed a specified rate are dropped. For E-EF frames, no remarking (e.g., re-assigning the drop precedence of frame to a different value) is allowed. The Ethernet expedited forwarding category 92 does not allow re-ordering of frames.

A complete end-to-end user service can include edge rules or conditioning in addition to forwarding treatment according to the assigned PHB. For example, a "premium" service' level (also be referred to as virtual leased line), uses E-EF PHB defined by a peak rate only. This "premium" service has low delay and small loss performance. A frame in the E-EF category can have forwarding treatment where the departure rate of the aggregate frames from a diff-serv node is set to equal or exceed a configurable rate. This rate is available independent of other traffic sharing the link. In addition, edge rules describe metering and peak rate shaping. For example, the metering/policing can enforce a peak rate and discard frames in excess of the peak rate. The metering/policing may not allow demotion or promotion. Peak rate shaping can smooth traffic to the network and convert traffic to constant rate arrival pattern. A combination of the forwarding behaviors and edge rules offer a "premium" service level. A premium service queue typically holds one frame or a few frames. An absolute priority scheduler increases the level of delay performance and could be offered initially on over-provisioning basis.

A second, more complex category, referred to as Ethernet assured forwarding (E-AF) 94 divides traffic into classes of service, and when the network is congested, frames can be discarded based on a drop precedence. More specifically, E-AF defines m (m>=1) classes with each class having n (n>1) drop precedence, levels. Frames marked with high drop precedence indication are discarded before frames with a low drop precedence on nodal congestion. At the Ethernet traffic meter, E-AF frames that exceed their assigned rate may be marked with high drop precedence indication (instead of dropping). The network typically does not extend any performance assurances to E-AF frames that are marked with high drop precedence indication. The nodal discard algorithm treats all frames within the same class and with the same drop precedence level equally. E-AF per-hop behavior does not allow re-ordering of frames that belong to the same flow and to the same E-AF class.

A third category, referred to as an Ethernet Class Selector (E-CS) 96 provides compatibility with legacy switches. Ethernet Class Selector includes up to eight p-bit combinations. For example, E-CS7 to E-CS0 with E-CS7 assigned the highest priority and E-CS0 assigned the lowest priority. E-CS frames can be metered at the network edge. E-CS does not allow significant re-ordering of frames that belong to the same CS class. For example, the node will attempt to deliver CS class frames in order, but does not guarantee that reordering will not occur, particularly under transient and fault conditions. All E-CS frames belonging to the same class are carried at the same drop precedence level.

The fourth category, a default-forwarding category 98 (E-DF), is suitable for implementing services with no performance guarantees. For example, this class can offer a "best-effort" type of service. E-DF frames can be metered at the network edge. This class of service should not allow (significant) re-ordering of E-DF frames that belong to the same flow and all E-DF frames are carried at the same drop precedence level.

Frame treatment can provide "differentiated services", for example, policing, marking, or re-coloring of p-bits, queuing, congestion control, scheduling, and shaping. While, the proposed Ethernet per-hop behaviors (PHB) include expedited forwarding (E-EF), assured forwarding (E-AF), default forwarding (E-DE), and class selector (E-CS), additional custom per-hop behaviors PHBs can be defined for a network. The three p-bits allow up to eight PHBs). If more PHBs are desired, multiple Ethernet connections (e.g., Ethernet interfaces or VLANs) can be used, each with up to eight additional PHBs. The mapping of the p-bits to PHBs may be signaled or configured for each interface/connection. Alternatively, in the network core, tunnels may be, used for supporting a larger number of PHBs.

Figure 6:
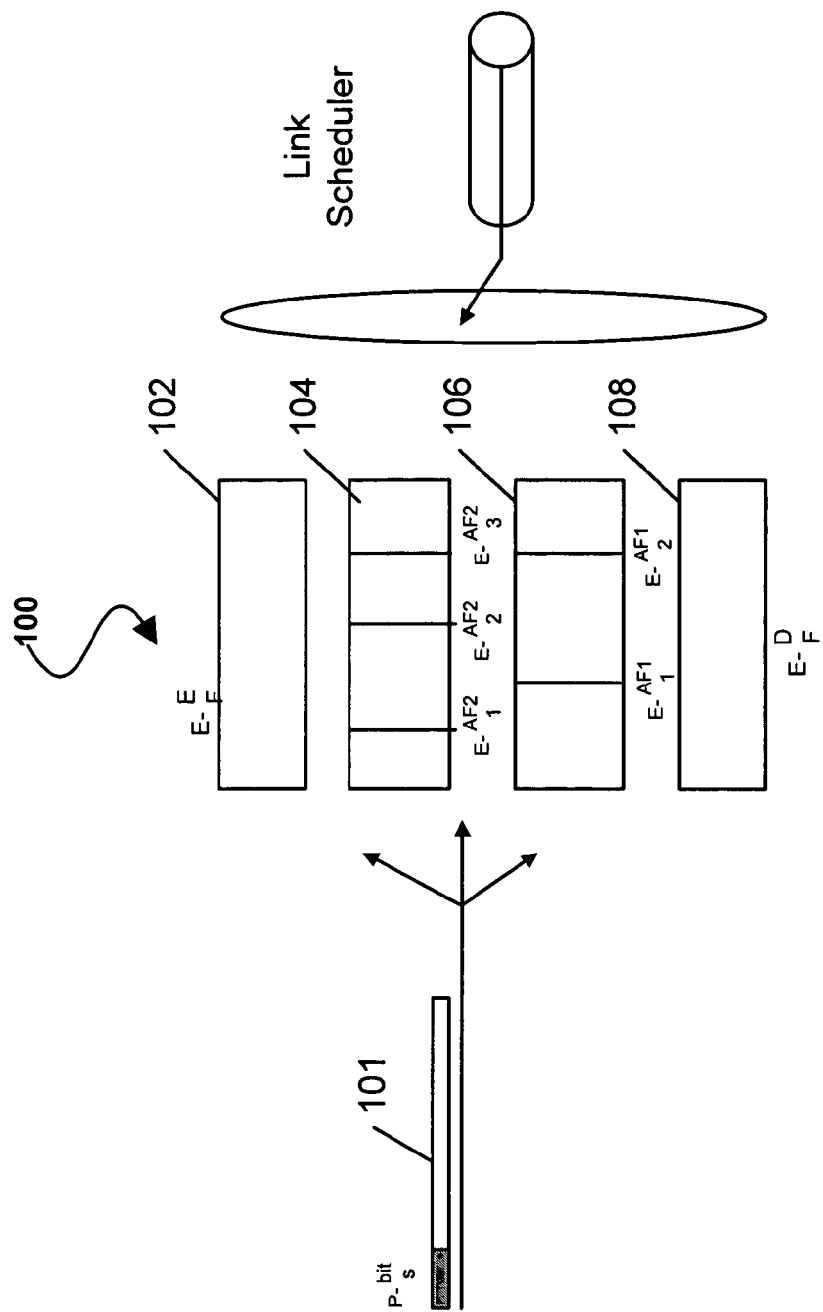
FIG. 6 is block diagram of a class-based scheduler using multiple queues

Referring to FIG. 6, an arrangement 100 for placing an incoming frame 101 in an appropriate class queue based on its p-bits 24 is shown. The arrangement 100 includes four queues 102, 104, 106, and 108. The queues 102, 104, 106, and 108 are assigned different priorities for forwarding the frame based on the different levels of services defined in, e.g., the Ethernet differentiated, service protocol. In this configuration, frames with p-bits mapped to E-EF differentiated service behaviors are placed in the highest priority queue 102. This queue does not allow frames to be discarded and all frames are of equal importance. In this example, queues 104 and 106 are allocated for forwarding frames with the assured service class of the differentiated services and frames are placed in this queue according to their p-bit assignment. In order to provide the level of service desired for assured services forwarding, each queue may be assigned a guaranteed minimum link bandwidth and frames are not re-ordered. However, if the network is congested the queues discard frames based on the assigned drop precedence. Queue 108 corresponds to a "best effort" queue. Frames placed in this queue are typically given a lower priority than frames in queues 102, 104, and 106. Queue 108 does not re-order the frames or allow for drop precedence differentiation.

While in the example above, at incoming frame was placed in one of four queues based on the p-bits 24, any number of queues could be used. For example, eight queues could provide placement of frames with each combination of p-bits 24 in a different queue.

In addition, the p-bits 24 can include congestion information in the forward and/or backward direction. This congestion information can be similar to forward explicit congestion notification (FECN) and backward explicit congestion notification (BECN) bits of the frame relay protocol. The congestion information signals a network device, for example, edge nodes or CEs, to throttle traffic until congestion abates. Out of the eight p-bit combinations, two combinations can be used for FECN (signaling congestion and no congestion) and two for the BECN direction.

In addition, the canonical format indicator (CFI), a one bit field in the Ethernet header, can be used for signaling congestion, or other QoS indicators such as frame drop precedence. The use of the CFI field in addition to (or in combination with) the p-bits 24 allows for support of additional PHBs. The p-bits can be used for signaling up to eight emission classes, and the CFI is used for drop precedence (two values) or a more flexible scheme, where the combined (p-bits+CFI) four bits can support 16 PHBs (instead of 8).

Referring to FIG. 7, an example of the assignment of p-bits 24 to represent nodal behaviors by mapping the p-bits 24 to combinations of the Ethernet differentiated service PHBs is shown. This assignment designates four groupings of nodal behaviors: E-EF, E-AF2, E-AF1, and E-DF. Each of the E-AF levels includes two drop precedence levels (i.e., E-AFX2 and E-AFX1) and thus, is assigned to two combinations of p-bits. The E-EF nodal behavior is mapped to the '111' combination 120 of p-bits, the E-AF2 nodal behaviors are mapped to the '110' and '101' combinations 122 and 124, the E-AF1 nodal behaviors are mapped to the '100' and '011' combinations 126 and 128, and the E-DF nodal behavior is mapped to the '010' combination 130. In this mapping of p-bits to nodal behaviors, two p-bits combinations 132 and 134 are reserved for congestion indication in the forward or backward direction.

For example, if the p-bits are assigned according to the mapping shown in FIG. 7 and the network includes a set of queues as shown in FIG. 6, frames can be routed to the appropriate queue based on the p-bit combination. Frames with a p-bit combination of '111' are placed in queue 102 and frames with a p-bit combination of '010' are placed in queue 108 frames with either a '011' or '100' p-bit combination are placed in queue 106 and frames with either a '101' or '110' p-bit combination are placed in queue 106. If the network is congested (e.g., the queue is full), frames in queue 104 or 106 are dropped according to their drop precedence based on the p-bit combination. For example, a high drop precedence (e.g., AF22) frame is discarded before a low drop precedence frame (e.g., AF21) under congestion. In queue 106 frames with the E-AF12 designation are discarded before frames with the E-AF11 designation. Based on the p-bits, dropping frames having an E-AF12 designation before dropping frames having an E-AF11 designation corresponds to frames with a p-bit combination of '100' being dropped before frames with a p-bit combination of '011'.

The assignment of p-bits shown in FIG. 7 is only one possible assignment. Other service configurations and p-bit assignments are possible. For example, the assignment can include three levels of assured services (E-AF), each having two different assignments to define the drop precedence of the frames and two remaining combinations of p-bits for congestion indication. Alternately, four assured services with two drop precedents could be mapped to the eight combinations. In another example, four combinations could be dedicated to fully define congestion in the forward and backward directions. In this example, two p-bit combinations are dedicated to forward congestion (or lack of), two p-bit combinations are dedicated to backward congestion (or lack of), and the remaining four p-bit combinations are used to define the nodal behaviors. These four p-bit combinations could include one assured service with two drop precedence and two CS services, or two assured services each having two different assignments to define the drop precedence of the frames.

The edge node (at either customer or provider side) may perform IP dDifferentiated services to Ethernet differentiated services mapping if the application traffic uses IP differentiated services. The mapping could be straightforward (e.g., IP-EF to E-EF, IP-AF to E-AF) if the number of IP PHBs used is limited to 8. Otherwise, some form of compression may be required to combine multiple IP PHBs into one E-PHB. Alternatively, multiple Ethernet connections (e.g., VLANs) can be used at the access and/or core, each supporting a subset of the required PHBs (e.g., VLAN-A supports E-EF/E-AF4/E-AF3, VLAN-B supports E-AF2/E-AF1/DF).

Typically, a class-based Queuing (CBQ) or a weighted fair queuing (WFQ) scheduler is used for forwarding frames on the egress link, at both edge and core nodes. The scheduling can be based on the PHB (subject to the constraints that some related PHBs such as an AFx group follow the same queue). The use of p-bits to indicate per-hop-behaviors allows for up to eight queues, or eight queue/drop precedence combinations.

Additional information may be available/acquired through configuration, signaling, or examining frame headers, and used for performing more advanced scheduling/resource management. Additional information can include, for example, service type, interface, or VID. For example, a 2-level hierarchical scheduler, where the first level allocates the link bandwidth among the VLANs, and the second level allocates the BW among the VLAN Differentiated services classes according to their PHB. Another example includes a 3-level hierarchical scheduler, where the first level allocates the link bandwidth among the service classes (e.g., business vs. residential), the second level allocates BW among the service VLANs, and the third level allocates the BW among the VLAN differentiated services classes according to their PHB.

The described Ethernet differentiated services architecture allows incremental deployment for supporting legacy equipment and network migration. Non-differentiated services capable nodes may forward all traffic as one class, which is equivalent to the E-DF class. Other 801.1Q nodes that use the p-bits simply to designate priority can interwork with Ethernet differentiated services nodes supporting the E-CS PHB. Some CoS degradation may occur under congestion in a network that uses a combination of E-differentiated services and legacy nodes.

Figure 8:
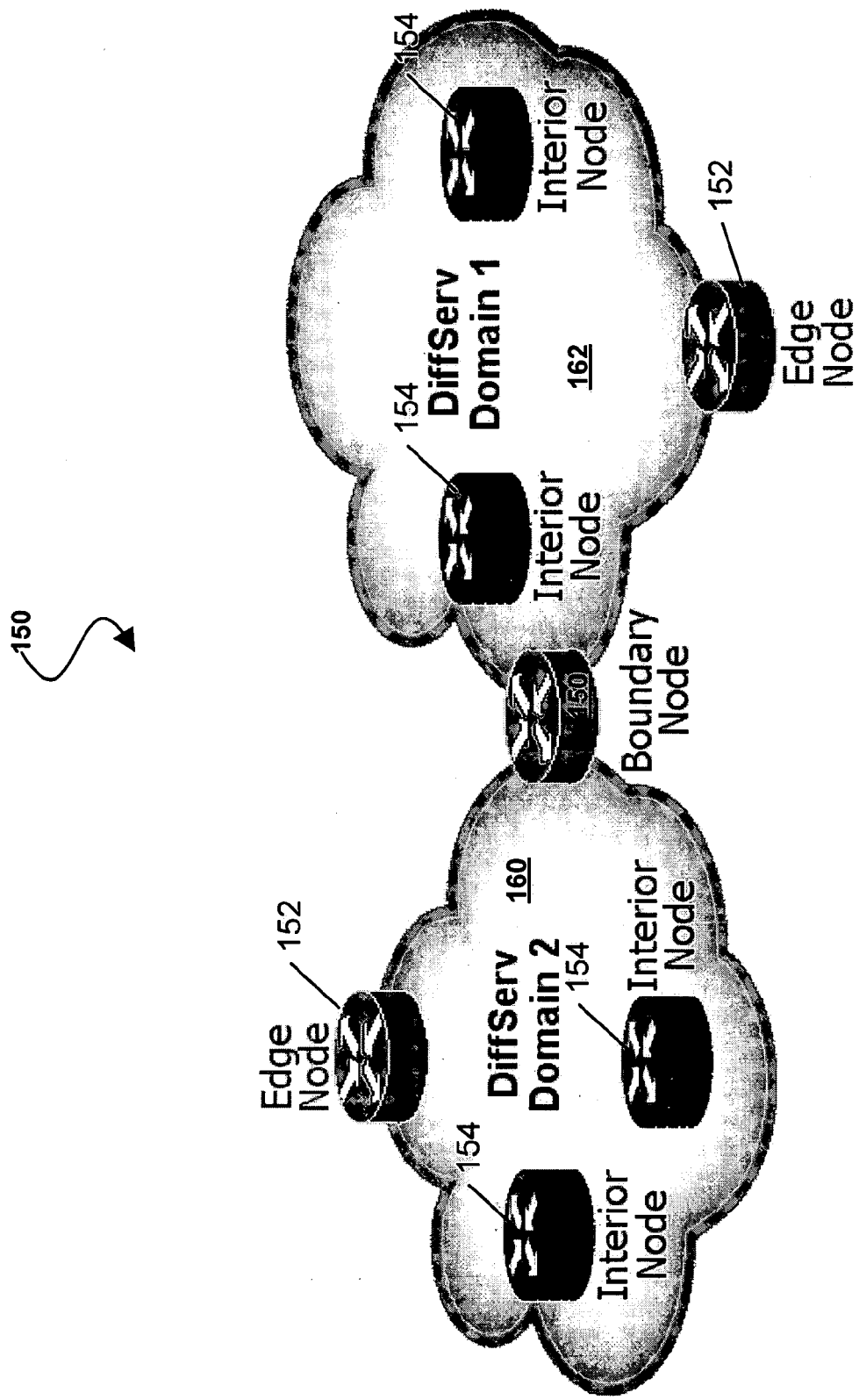
FIG. 8 is a block diagram of a differentiated services network having multiple domains.

Referring to FIG. 8, an Ethernet differentiated services network 150 having multiple domains 160 and 162 is shown. An Ethernet Differentiated services domain has a set of common QoS Policies, and may be part of an enterprise or provider network. The set of QoS policies can include Ethernet PHBs support, p-bits interpretation, etc. Edge nodes (e.g., nodes 152) interconnect sources external to a defined network (e.g., customer equipment). The Ethernet edge node 152 typically performs extensive conditioning functions. Interior Nodes 154 connect trusted sources in the same Differentiated services domain. Interior nodes 154 perform simple class-based forwarding. Boundary nodes 156 interconnect Differentiated services domains and may perform E-Differentiated services conditioning functions similar to edge nodes. This may include performing p-bit mapping, due to of different domain capabilities or policies.

Traffic streams may be classified, marked, and otherwise conditioned on either end of a boundary node. The service level agreement between the domains specifies which domain has responsibility for mapping traffic streams to behavior aggregates and conditioning those aggregates in conformance with the appropriate behavior. When frames are pre-marked and conditioned in the upstream domain, potentially fewer classification and traffic conditioning rules need to be supported in the downstream E-DS domain. In this circumstance, the downstream E-DS domain may re-mark or police the incoming behavior aggregates to enforce the service level agreements. However, more sophisticated services that are path-dependent or source-dependent may require MF classification in the downstream domain's ingress nodes. If an ingress node is connected to an upstream non-Ethernet differentiated services capable domain, the ingress node performs all necessary traffic conditioning functions on the incoming traffic.

Figure 9:
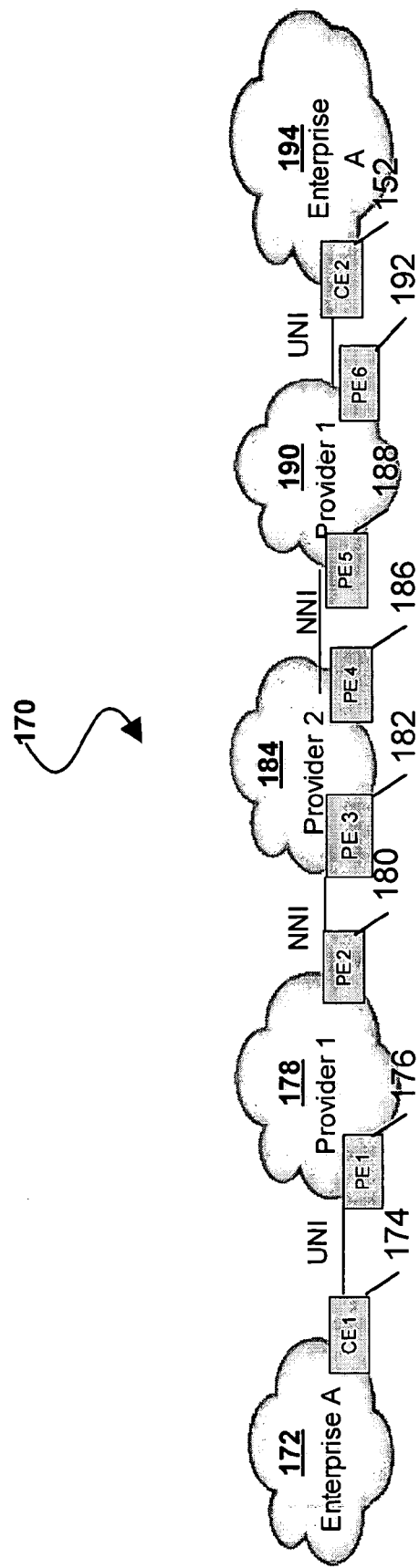
FIG. 9 is a architecture for end-to-end service across multiple provider networks.

Referring to FIG. 9, an example 170 for end-to-end service across multiple provider networks is shown. The example architecture shows the connection of two enterprise campuses, campus 172 and campus 194 through provider networks 178, 184, and 190. A user network interface (UNI) is used between the enterprise and provider edges and a network-network interface (NNI) is used between two providers. The end-to-end service level agreements are offered through bilateral agreements between the enterprise 172 and provider 178 and enterprise 194 and provider 190. Provider 178 has a separate SLA agreement with provider 184 and provider 190 has a separate SLA agreement with provider 184, to ensure that it can meet, the enterprise end-to-end QoS. Three Ethernet differentiated services domains are shown: Enterprise A, Access Provider 1, and Backbone Provider 2. Each domain has its own set of Ethernet PHBs and service policies.

Although the basic architecture assumes that complex classification and traffic conditioning functions are located only in a network's ingress and egress boundary nodes, deployment of these functions in the interior of the network is not precluded. For example, more restrictive access policies may be enforced on a transoceanic link, requiring MF classification and traffic conditioning functionality in the upstream node on the link.

A number of embodiments of the invention have been described. Nevertheless, it will be understood that various modifications may be made without departing from the spirit and scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A communications network, the network comprising:
   an edge node including an edge node port receiving traffic in the network, the edge node being configured to:
   a) classify the traffic to select a per-hop behavior according to at least one of a Layer 1 to Layer 7 (L1-L7) header information in the traffic; and
   b) set priority bits in tag fields of headers of ethernet frames carrying the classified traffic to identify the selected per hop behavior; and
   a core node including a core node port receiving the ethernet frames carrying the classified traffic, the core node being configured to process the ethernet frames according to the per-hop behavior identified by the priority bits.

2. The network of claim 1, wherein the processing by the core node includes dropping ethernet frames.

3. The network of claim 2, wherein the ethernet frames are dropped based on their drop precedence level.

4. The network of claim 3, wherein the drop precedence level of a frame is associated with a class of the frame that defines the identified per-hop behavior.

5. The network of claim 1, wherein the processing by the core node includes shaping ethernet frames.

6. The network of claim 1, wherein the processing by the core node includes remarking ethernet frames.

7. The network of claim 1, wherein the selected per-hop behavior includes expedited forwarding.

8. The network of claim 1, wherein the selected per-hop behavior includes assured forwarding.

9. The network of claim 1, wherein the selected per-hop behavior includes default forwarding.

10. The network of claim 1, wherein the at least one of the L1-L7 header information includes a differentiated services code point.

11. A core node in a network, the core node comprising:
    a port configured to receive ethernet frames carrying traffic, the ethernet frames having priority bits in tag fields of headers that are set to identify per-hop behavior; and
    the core node being configured to process the ethernet frames according to the per-hop behavior identified by the priority bits, the identified per-hop behavior being selected by classifying the traffic according to at least one of the L1-L7 header information in the traffic.

12. The core node of claim 11, wherein the processing by the core node includes dropping ethernet frames.

13. The core node of claim 12, wherein ethernet frames are dropped based on their drop precedence level.

14. The core node of claim 13, wherein the drop precedence level of a frame is associated with a class of the frame that defines the identified per-hop behavior.

15. The core node of claim 11, wherein the processing by the core node includes shaping ethernet frames.

16. The core node of claim 11, wherein the processing by the core node includes remarking ethernet frames.

17. The core node of claim 11, wherein the selected per-hop behavior includes expedited forwarding.

18. The core node of claim 11, wherein the selected per-hop behavior includes assured forwarding.

19. The core node of claim 11, wherein the selected per-hop behavior includes default forwarding.

20. The core node of claim 11, wherein the at least one of the L1-L7 header information includes a differentiated services code point.

* * * * *

UNITED STATES PATENT AND TRADEMARK OFFICE
CERTIFICATE OF CORRECTION

PATENT NO.         : 8,687,633 B2                                Page 1 of 1
APPLICATION NO.    : 12/939304
DATED              : April 1, 2014
INVENTOR(S)        : Sameh Rabie et al.

It is certified that error appears in the above-identified patent and that said Letters Patent is hereby corrected as shown below:

On the title page, column 2, References Cited under "Other Publications", line 3, replace:
"May 19-31, 2001" with --May 29-31, 2001--.

Signed and Sealed this
Twelfth Day of August, 2014

Michelle K. Lee
*Deputy Director of the United States Patent and Trademark Office*